US009709771B2

(12) United States Patent
Corrigan et al.

(10) Patent No.: US 9,709,771 B2
(45) Date of Patent: Jul. 18, 2017

(54) LIGHT CONCENTRATOR ALIGNMENT SYSTEM

(71) Applicant: 3M INNOVATIVE PROPERTIES COMPANY, St. Paul, MN (US)

(72) Inventors: Thomas R. J. Corrigan, St. Paul, MN (US); Timothy L. Quinn, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/435,852

(22) PCT Filed: Oct. 25, 2013

(86) PCT No.: PCT/US2013/066787
§ 371 (c)(1),
(2) Date: Apr. 15, 2015

(87) PCT Pub. No.: WO2014/070603
PCT Pub. Date: May 8, 2014

(65) Prior Publication Data
US 2015/0301306 A1   Oct. 22, 2015

Related U.S. Application Data

(60) Provisional application No. 61/719,998, filed on Oct. 30, 2012.

(51) Int. Cl.
*F24J 2/38* (2014.01)
*G02B 7/183* (2006.01)
(Continued)

(52) U.S. Cl.
CPC ............. *G02B 7/183* (2013.01); *F24J 2/067* (2013.01); *F24J 2/12* (2013.01); *F24J 2/18* (2013.01);
(Continued)

(58) Field of Classification Search
None
See application file for complete search history.

(56) References Cited

U.S. PATENT DOCUMENTS 3,996,917 A  *  12/1976  Trihey ................. F24J 2/07
                                                          126/576
4,013,885 A  *  3/1977   Blitz .................. F24J 2/38
                                                          126/573
(Continued)

FOREIGN PATENT DOCUMENTS

CN     201274018      7/2009
DE     2742014        3/1978
(Continued)

OTHER PUBLICATIONS

English Machine Translation of WO 2012-123433, Couturier et al., 4 pages.*

(Continued)

*Primary Examiner* — Derek S Chapel
(74) *Attorney, Agent, or Firm* — Philip Y. Dahl; Robert V. Heiti

(57) ABSTRACT

The disclosure generally relates to concentrating daylight collectors and in particular to a light concentrator alignment system that can detect and correct for misalignment of the solar concentrator. The present disclosure generally relates to concentrating daylight collectors that can be used for illuminating interior spaces of a building with sunlight, and in particular to a light concentrator alignment system that can detect and correct for misalignment of the solar concentrator.

2 Claims, 7 Drawing Sheets

(51) Int. Cl.
*F24J 2/06* (2006.01)
*F24J 2/18* (2006.01)
*F24J 2/40* (2006.01)
*F24J 2/54* (2006.01)
*F24J 2/12* (2006.01)

(52) U.S. Cl.
CPC ............... *F24J 2/38* (2013.01); *F24J 2/402* (2013.01); *F24J 2/542* (2013.01); *Y02B 10/20* (2013.01); *Y02E 10/42* (2013.01); *Y02E 10/47* (2013.01)

(56) References Cited

U.S. PATENT DOCUMENTS

| | | | |
|---|---|---|---|
| 4,041,307 A | 8/1977 | Napoli | |
| 4,159,710 A | 7/1979 | Prast | |
| 4,198,954 A * | 4/1980 | Meijer | F24J 2/12 126/579 |
| 4,263,892 A | 4/1981 | Little | |
| 4,297,000 A | 10/1981 | Fries | |
| 4,449,514 A * | 5/1984 | Selcuk | F24J 2/07 126/571 |
| 4,498,456 A | 2/1985 | Hashizume | |
| 8,459,865 B1 * | 6/2013 | Andraka | G01S 3/7861 136/206 |
| 2005/0046977 A1 * | 3/2005 | Shifman | F24J 2/12 359/853 |
| 2009/0250098 A1 * | 10/2009 | Pan | H01L 31/052 136/248 |
| 2011/0114082 A1 * | 5/2011 | Nakamura | F24J 2/07 126/643 |
| 2011/0174359 A1 | 7/2011 | Goei | |
| 2013/0081668 A1 * | 4/2013 | Linderman | F24J 2/38 136/246 |

FOREIGN PATENT DOCUMENTS

| | | |
|---|---|---|
| EP | 0015148 | 9/1980 |
| EP | 0071550 | 2/1983 |
| EP | 1475582 | 11/2004 |
| GB | 2458639 | 3/2012 |
| JP | 2003-240356 | 8/2003 |
| KR | 101096606 | 12/2011 |
| WO | WO 2006-118912 | 11/2006 |
| WO | WO 2012-021471 | 2/2012 |
| WO | WO 2012-123433 | 9/2012 |
| WO | WO 2013-112362 | 8/2013 |
| WO | WO 2013-154917 | 10/2013 |

OTHER PUBLICATIONS

International Search report for PCT International Application No. PCT/US2013/066787 mailed on Apr. 17, 2014, 4 pages.

* cited by examiner

LIGHT CONCENTRATOR ALIGNMENT SYSTEM

U.S. GOVERNMENT RIGHTS

This disclosure was made with Government support under Contract Number W912HQ-11-C-0025 awarded by DOD. The Government has certain rights in this disclosure.

BACKGROUND

The long-distance transport of visible light through a building can use large mirror-lined ducts, or smaller solid fibers which exploit total internal reflection. Mirror-lined ducts include advantages of large cross-sectional area and large numerical aperture (enabling larger fluxes with less concentration), a robust and clear propagation medium (that is, air) that leads to both lower attenuation and longer lifetimes, and a potentially lower weight per unit of light flux transported. Regardless of the technique used to transport light effectively, a practical and efficient daylight collector that can also concentrate the collected light, and a technique to accurately align the concentrator is needed.

SUMMARY

The disclosure generally relates to concentrating daylight collectors and in particular to a light concentrator alignment system that can detect and correct for misalignment of the solar concentrator. The present disclosure generally relates to concentrating daylight collectors that can be used for illuminating interior spaces of a building with sunlight, and in particular to a light concentrator alignment system that can detect and correct for misalignment of the solar concentrator. In one aspect, the present disclosure provides a solar concentrator alignment device that includes a solar light duct having an aperture; a thermally conductive plate essentially parallel to and exterior to the aperture; and at least two thermal sensors in contact with the thermally conductive plate, the at least two thermal sensors being separated from each other at positions surrounding the aperture. A concentrated solar light beam can be aligned to the aperture such that a first portion of the concentrated light beam intercepts the aperture and a second portion of the concentrated light beam intercepts the thermally conductive plate, causing the at least two thermal sensors to generate an aligned output signal, and a change in the second portion of the concentrated solar light beam that intercepts the thermally conductive plate causes the at least two thermal sensors to generate a misaligned output signal.

In another aspect, the present disclosure provides a solar concentrator alignment device that includes an aperture for receiving a concentrated solar light beam; a thermally conductive plate parallel to and adjacent the aperture; and a plurality of thermal sensors in contact with the thermally conductive plate, the plurality of thermal sensors being separated from each other at positions surrounding the aperture. The concentrated solar light beam generates an aligned output signal from the plurality of thermal sensors when aligned to the aperture, and the concentrated solar light beam generates a misaligned output signal from the plurality of thermal sensors when misaligned to the aperture.

In yet another aspect, the present disclosure provides a method for maintaining the alignment of a solar concentrator to the sun that includes providing a solar concentrator including a solar concentrator alignment device; initially aligning the solar concentrator to the sun, thereby providing the aligned output signal; providing a control system capable of changing the azimuth and elevation of the solar concentrator; monitoring the thermal sensors for a misaligned output signal; and changing the azimuth and/or elevation of the solar concentrator to change the misaligned output signal to the aligned output signal. The solar concentrator alignment device includes a solar light duct having an aperture; a thermally conductive plate essentially parallel to and exterior to the aperture; and at least two thermal sensors in contact with the thermally conductive plate, the at least two thermal sensors being separated from each other at positions surrounding the aperture. A concentrated solar light beam can be aligned to the aperture such that a first portion of the concentrated light beam intercepts the aperture and a second portion of the concentrated light beam intercepts the thermally conductive plate, causing the at least two thermal sensors to generate an aligned output signal, and a change in the second portion of the concentrated solar light beam that intercepts the thermally conductive plate causes the at least two thermal sensors to generate a misaligned output signal.

In yet another aspect, the present disclosure provides a method for maintaining the alignment of a solar concentrator to the sun that includes providing a solar concentrator including a solar concentrator alignment device; initially aligning the solar concentrator to the sun, thereby providing the aligned output signal; providing a control system capable of changing the azimuth and elevation of the solar concentrator; monitoring the thermal sensors for a misaligned output signal; and changing the azimuth and/or elevation of the solar concentrator to change the misaligned output signal to the aligned output signal. The solar concentrator alignment device includes an aperture for receiving a concentrated solar light beam; a thermally conductive plate parallel to and adjacent the aperture; and a plurality of thermal sensors in contact with the thermally conductive plate, the plurality of thermal sensors being separated from each other at positions surrounding the aperture. The concentrated solar light beam generates an aligned output signal from the plurality of thermal sensors when aligned to the aperture, and the concentrated solar light beam generates a misaligned output signal from the plurality of thermal sensors when misaligned to the aperture.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
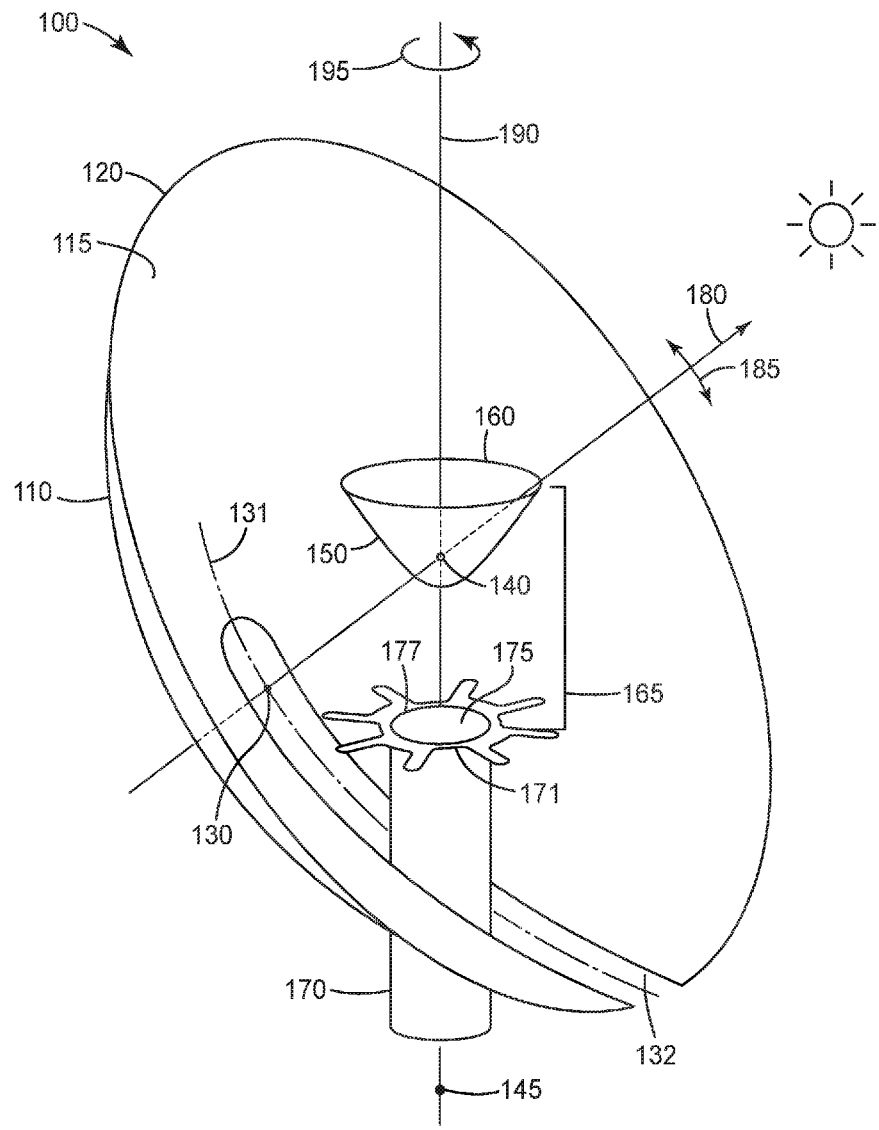
FIG. 1 shows a perspective view of a solar concentrator.

The disclosure generally relates to concentrating daylight collectors and in particular to a light concentrator alignment system that can detect and correct for misalignment of the solar concentrator. The present disclosure generally relates to concentrating daylight collectors that can be used for illuminating interior spaces of a building with sunlight, and in particular to a light concentrator alignment system that can detect and correct for misalignment of the solar concentrator.

The concentrating daylight collectors can be used to direct sunlight into a mirror-lined duct to distribute the sunlight throughout the building to a point of extraction of the light through a light distribution mirror-lined duct. In some cases, the disclosed concentrating daylight collectors can instead be used more conventionally, such as for directing sunlight onto a photovoltaic cell for generation of electrical power, or an absorbing surface for extraction of thermal energy. The concentrating daylight collectors can be useful for interior lighting of a building and generally can include a cassegrain-type concentrator section that provides for a full-tracking solar concentrator with one moving part and with a high efficiency of coupling of collected solar irradiation to a stationary duct.

A novel apparatus and technique is disclosed for providing direct feedback on the alignment of a solar concentrator with the sun, by monitoring the position of the concentrated light beam. In one particular embodiment, multiple pads with thermocouples can be located around the periphery of the target for the concentrated light, for example, around the inlet duct in a concentrated solar lighting system. When the solar concentrating system moves out of alignment, the concentrated light beam moves off the target and some of the energy will be absorbed by one or more of the pads with thermocouples. The difference monitored between thermocouples can be used to steer the system back into alignment. It is to be understood that although the disclosed solar concentrator alignment devices can be used with any suitable solar collection system or solar concentrator system, much of the discussion that follows is directed toward the use with cassegrain-type solar concentrators, and is not intended to limit the application of these solar concentrator alignment devices in any way.

The present disclosure is related to architectural daylighting and to solar concentration in general. Prior to the present invention, no system existed for controlling the alignment of a solar concentrator with the sun by utilizing feedback that is directly related to the output of the concentrator. Typical currently available solutions for alignment include: (a) Operating the concentrator "open loop" with no feedback. For some systems this can be acceptable (that is simple photovoltaics), but for many systems (that is concentrated daylighting) a small misalignment of the optics for example either due to minor disturbances or thermal expansion, could drastically reduce the output; (b) Mounting an external device onto the solar concentrator. The device is aligned to the concentrator system and the assumption is made that it will not be disturbed, since there is no ability to actually measure the light that is reaching the target. The external devices often involve photodiodes that are only exposed to the sun when the device is misaligned from the sun; (c) Measuring the amount of light in the outlet duct as a feedback on the alignment of the system, as described, for example in co-pending U.S. Patent Application Ser. No. 61/623,225 entitled FLUORESCENT FIBER LIGHT SENSOR (filed on Apr. 12, 2012). The device must then be moved away from the current target location to measure a decrease in the output which can be used to align the position.

In one particular embodiment, the present invention has an advantage over the above described fiber sensor, because it can provide an output that is directly related to a positioning error. For example if the system has moved too far to the East (on the azimuthal axis) then a single thermocouple will get warmer and provide a direct value telling the system to move back the other direction. The described system can also be used to align other solar tracking systems, but will be most effective if the system is concentrating solar energy, because a more significant increase in temperature will be produced by a misalignment of the system.

Errors in the azimuth (east-west rotation) alignment generally cause the concentrated light of the cassegrain-type concentrator to drift out of the duct along the axis of rotation of the parabola. Similarly, an error in the elevation (or altitude) axis of rotation will cause the light to drift in the orthogonal direction, as described elsewhere.

The difference between the average temperature and any extreme temperatures can be used to detect a misalignment of the system. In one particular embodiment, all of the sensors have identical thermal mass, and should therefore increase and decrease in temperature uniformly due to ambient changes in temperature and light. The average temperature from the sensors can also be used to signal a significant problem if the system is getting too hot.

In one particular embodiment, the disclosed light concentrator alignment system is used in conjunction with another solar positioning algorithm. The light concentrator alignment system is optimally used as a "focus" system on top of the solar positioning algorithm. For example, if the concentrator begins to track the sun in the morning and then clouds come out decreasing the light flux gathered by the concentrator, the thermal sensor may not adjust the positioning because all of the sensors measure a "cold" signal. When the sun later comes from behind the clouds, it may be so far out of alignment that the thermal sensor may not be capable of adjusting the position. Instead, the system tracks the solar position based on an open loop NREL (National Renewable Energy Laboratory) type algorithm, and the solar alignment system will do the fine adjustments necessary to optimize the light output within some cone of error, generally defined by the outside diameter of the thermal plate, as described elsewhere. Regardless, the output of the present light concentrator alignment system uses the optic concentration system to fine-tune the solar tracking, rather than the direct sun exposure, resulting in more rapid and sensitive alignment control. Currently available direct sun exposure systems generally use a shading device that casts a shadow on one of a pair of thermal sensors, not the concentrated output of an optics system.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

The elements of and construction of light sources that can provide suitable solar light input are described elsewhere, for example, in U.S. Patent Application Ser. No. 61/589,544 entitled OFF AXIS CASSEGRAIN SOLAR COLLECTOR (filed Jan. 23, 2012), and PCT Patent Publication No. WO2012021471 entitled CONCENTRATING DAYLIGHT COLLECTOR (filed Aug. 13, 2010), which generally describe solar concentrators which can provide sunlight with the required characteristics. The addition of an artificial light source, alone or in combination with a solar concentrator, can be useful to broadening the utility of an architectural light delivery and distribution system. For the purposes of the present disclosure, the description of the 'lighting system' references both solar and artificial sources.

Architectural daylighting using mirror-lined light ducts can deliver sunlight deep into the core of multi-floor buildings. Such mirror-lined light ducts can be uniquely enabled by the use of 3M optical films, including mirror films such as Vikuiti™ ESR film, that have greater than 98% specular reflectivity across the visible spectrum of light. Architectural daylighting is a multi-component system that includes a device for collecting sunlight, and light ducts and extractors for transporting and distributing the sunlight within the building. The typical benefits of using sunlight for interior lighting can include a reduction of energy for office lighting by an average of 25%, improved light quality due to the full spectrum light delivered, and is often more pleasing to office occupants.

The ducted illumination systems useful for architectural daylighting can also be useful for distribution of auxiliary or artificially generated light efficiently throughout a building. For example, it is widely accepted that LED lighting may eventually replace a substantial portion of the world's installed base of incandescent, fluorescent, metal halide, and sodium-vapor fixtures. One of the primary driving forces is the projected luminous efficacy of LEDs versus those of these other sources.

An appropriate figure of merit describing the value of a solar collector for core architectural daylighting is the cost of the collector per lumen of light delivered. Value increases as the cost per lumen decreases. Both reduced cost and increased flux increase the value of a collector. The cost of a collector is largely dictated by its size, its tracking requirements, and its complexity. It is generally not advantageous to sacrifice either size or tracking, as these attributes are critical to high flux. There is, however, the possibility of reducing complexity by minimizing the number of moving parts.

A collector for daylighting can preferably deposit its flux within a stationary duct with the luminance associated with that flux substantially collimated about the axis of the duct. Tracking collectors can therefore include a means for transporting and redirecting a moving and tilting distribution of concentrated luminance to a fixed position and a fixed direction. The value of the collector can be increased by improving the efficiency of this coupling.

The Cassegrain concentrator utilizes 1) a parabolic mirror to focus rays incident parallel to the optical axis of the parabola to a point on the optical axis of the parabola, and 2) a hyperbolic mirror, with its interior focus coincident with the parabolic focus, to refocus these rays to the exterior focus of the hyperbola on the optical axis of the hyperbola. In the standard Cassegrain configuration, the axes of the hyperbola and parabola are coincident so that the final focus lies on these common axes. In the off-axis configuration described herein, the axis of the parabola can be tilted relative to the hyperbola axis, so that the final focus lies off the axis of the parabola. The off-axis configuration allows for a stationary final focus, and this can solve two fundamental problems of solar concentrators for daylighting; specifically, the off-axis configuration allows only the parabola to move, and it increases the efficiency of coupling to the stationary duct.

The disclosed solar concentrator accepts direct solar illuminance over a large area and tracks the sun. Generally, substantially all of the associated flux is injected into a stationary duct, with the luminance associated with that flux substantially collimated about the axis of the duct. In one particular embodiment, the solar concentrator design uses an off-axis Cassegrain configuration that includes a movable parabolic mirror which tracks the sun, and a stationary hyperbolic mirror and a stationary duct. This configuration can maximize the efficiency of collection while minimizing the number of moving components required for tracking the sun.

The concentrator can harvest more flux per unit area of its footprint than many alternatives. It can deliver this flux with a higher concentration than any known alternative (enabling small light-distribution ducts), and with a degree of collimation, which is well suited for hollow light-guiding systems with side-wall extraction. In some cases, the concentrating daylight collectors can be positioned either on a roof or on the sun-facing sides of a building. Generally, rooftop placement of a concentrating daylight collector can more readily provide for an unobstructed view of the sun throughout the daylight hours; however, in some cases, mounting on the side of the building may be preferable.

The concentrating daylight collector harvests highly-collimated solar flux from a large area and deposits it with controlled (and necessarily diminished) collimation within a much smaller area, for example, a mirror-lined duct system for distribution throughout the building. The concentrating daylight collector can be a solar collector/concentrator that tracks the sun's position throughout the day, and precisely aligns the concentrator to maximize the solar input to the duct.

In one particular embodiment, the concentrating daylight collector can include a Cassegrain-telescope type concentrator, known to those of skill in the art. Such a concentrator typically includes a combination of a parabolic mirror and a hyperbolic mirror. Generally, the focus of the parabolic mirror and one of the focal points of the hyperbolic mirror are placed such that they approximate a common focal point. The second focal point of the hyperbolic mirror can be positioned along the axis of a light duct suitable for collecting the light reflected from the hyperbolic mirror. The light duct can be disposed in a slot that is formed in the parabolic mirror between the vertex and the outer rim of the parabolic mirror. The centerline of the slot lies within the plane containing the parabolic vertex and both the hyperbolic focal points. In this fashion, the parabolic reflector is capable of rotating around the light duct axis such that the concentrating daylight collector tracks the path of the sun. In particular, a line between the parabolic focal point and the vertex can be aligned to an azimuth angle and an elevation angle of the sun, such that light rays are directed toward the parabolic focal point, as described elsewhere.

FIG. 1 shows a perspective view of a solar concentrator 100, according to one aspect of the disclosure. Solar concentrator 100 includes a parabolic reflector 110 having an interior reflective surface 115 and a first outer rim 120. The interior reflective surface 115 can be any suitable material having a high specular reflectivity including, for example, a first- or second-surface mirror such as a metal vapor-coated mirror or other reflective metal; the interior reflective surface can instead include a polymeric multilayer interference reflector such as Vikuiti™ ESR film, available from 3M Company. The parabolic reflector 110 has a geometry that can be characterized by a parabolic focal point 140, a vertex 130, and a first axis 180 extending between the vertex 130 and parabolic focal point 140. Solar concentrator 100 further includes a hyperbolic reflector 150 having a second outer rim 160, a first focal point coincident with the parabolic focal point 140, and a second focal point 145. The hyperbolic reflector 150 can be fabricated from the same or different material that is suitable for the interior reflective surface 115, described above. A second axis 190 extends along a line that includes the parabolic focal point 140 and the second focal point 145.

In one particular embodiment, second axis 190 can be pointed toward the zenith (that is, perpendicular to the horizontal); however, in other embodiments, second axis 190 can be pointed instead at any desired angle or orientation to the zenith. For example, the second axis 190 of the solar concentrator 100 can be directed toward the horizontal for a building side mounted concentrator. A tilt angle of the second axis 190 can depend upon the placement of the solar concentrator 100, including, for example, latitude, unobstructed view, duration and times for optimum daylighting, and the like, as described elsewhere. First axis 180 is capable of rotating about the second axis 190 along an azimuthal direction 195, without movement of the second axis 190. First axis 180 is also capable of rotating along an elevation direction 185 that pivots around the parabolic focal point 140 and lies in the plane that includes the vertex 130 and the second axis 190. In one particular embodiment, first axis 180 can be positioned toward the sun, such that solar radiation incident upon the parabolic reflector 110 and reflecting from the hyperbolic reflector 150, propagates within an output collimation angle of the second axis 190, as described elsewhere.

An optional exit aperture 132 can be disposed in the parabolic reflector 110, along a line 131 passing through the vertex 130 and lying in the plane that includes the vertex 130 and the second axis 190. In some cases, the optional exit aperture 132 can comprise a material that is transparent to solar radiation such as a polymer or a glass; in some cases, the optional exit aperture 132 can be a slot cut in the parabolic reflector 110. In one particular embodiment, the optional exit aperture 132 can extend along the line 131 from the vertex 130 to the first outer rim 120.

A light duct 170 can be disposed along the second axis 190, and in the case where the optional exit aperture 132 is a slot, the light duct 170 can extend through the parabolic reflector 110 as shown. In some cases, a support structure 165 can affix hyperbolic reflector 150 to light duct 170. Support structure 165 can be any suitable support as known to one of skill in the art that supports hyperbolic reflector 150 such that the parabolic focal point 140 and the second focal point 145 remain fixed and do not move. In some cases, support structure 165 can affix hyperbolic reflector 150 to one axis of rotation of the parabolic reflector 110 such that the hyperbolic reflector can rotate about the second axis 190, as described elsewhere. The light duct 170 includes an upper rim 177 and an entrance aperture 175 positioned such that light reflected from the hyperbolic reflector 150 enters light duct 170 through entrance aperture 175 and is directed toward second focal point 145. In one particular embodiment, entrance aperture 175 can be the same size as the perimeter of the light duct 170, for example, coincident with the upper rim 177. In some cases, entrance aperture 175 can instead correspond to the size of the concentrated light beam entering the duct through the region bounded by the upper rim 177, and in such cases, the entrance aperture 175 can be smaller than the perimeter of the light duct 170. Light duct 170 can be a portion of a light distribution system (not shown) used for daylight distribution system for architectural lighting. Light duct 170 can be a rectangular light duct, a cylindrical light duct, or any other suitably shaped light duct for the efficient transmission of light, as described elsewhere.

A solar concentrator alignment device 171 is positioned proximate the entrance aperture 175 and adjacent the upper rim 177 of the light duct 170. The solar concentrator alignment device 171 comprises a thermally conductive plate, as described elsewhere. The thermally conductive plate can be fabricated from any suitable material having a high thermal conductivity, including metals and metal alloys such as aluminum, copper, steel, and the like. In one particular embodiment, the thermally conductive plate can be an aluminum plate having a thickness ranging from about 0.125 inches (3.175 mm) to about 0.25 inches (6.35 mm) or more. In some cases, the thermally conductive plate can be blackened by chemical treatment or painting, to alter the thermal absorbance or emission from the surface of the plate, as known to one of skill in the art.

In one particular embodiment, the solar concentrator alignment device 171 can be positioned essentially parallel to and exterior to the entrance aperture 175. In some cases, the solar concentrator alignment device 171 can instead extend into the entrance aperture 175, for example, within the region bounded by the upper rim 177 of the light duct 170. In one particular embodiment, the solar concentrator alignment device 171 can be positioned flush with the upper rim 177 of the light duct 170, or it can be positioned anywhere along the second axis 190 between the hyperbolic reflector 150 and the second focal point 145. In some cases, the solar concentrator alignment device 171 can even be positioned further within the light duct 170, for example beyond the second focal point 145; however, this would not be a preferred position. Generally, a preferred location for the solar concentrator alignment device 171 is attached to the light duct 170 along the upper rim 177.

Figure 2A:
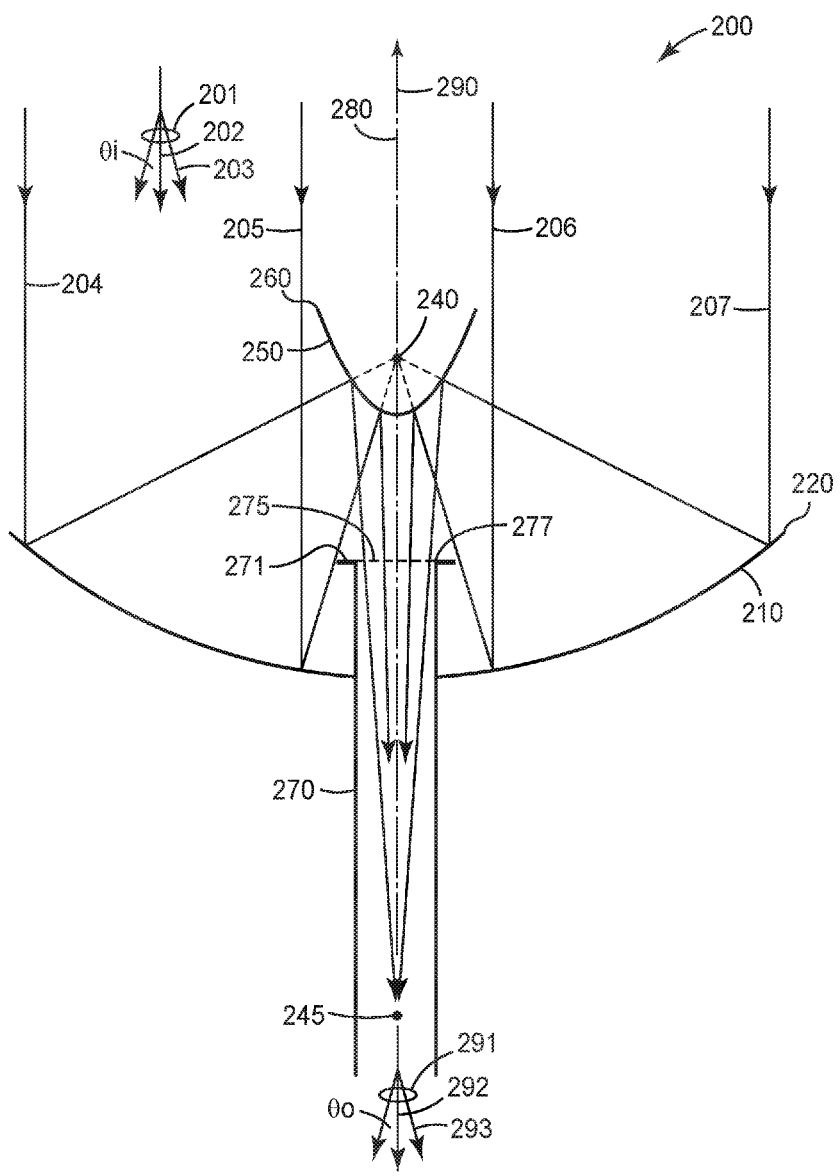
FIG. 2A shows a cross-sectional schematic view of a solar concentrator in solar alignment.

FIG. 2A shows a cross-sectional schematic view of an aligned solar concentrator 200, according to one aspect of the disclosure. FIG. 2A shows a schematic cross-section tracing the paths of representative light rays entering solar concentrator 200, according to one aspect of the disclosure. Each of the elements 210-290 shown in FIG. 2A correspond to like-numbered elements 110-190 shown in FIG. 1, which have been described previously. For example, parabolic reflector 210 shown in FIG. 2A corresponds to parabolic reflector 110 shown in FIG. 1, and so on. An input light beam 201 from a source, such as the sun, includes a central light ray 202 travelling along the propagation direction, and boundary light rays 203 traveling within an input collimation angle θi of the central light ray 202. Each of the light rays 204, 205, 206, 207 entering solar concentrator 200 and travelling parallel to the first axis 280 within the input collimation angle θi, reflect from the parabolic reflector 210 and are directed toward the parabolic focal point 240. Each of the light rays 204, 205, 206, 207 then reflect from the hyperbolic reflector 250 and are directed toward the second focal point 245, through the region where a solar concentrator alignment device 271 is disposed adjacent the entrance aperture 275 and exterior to the upper rim 277. The light rays 204, 205, 206, 207 exit as output light beam 291 having a central light ray 292 travelling in the propagation direction, and boundary light rays 293 travelling within an output collimation angle θo of the central light ray 292.

Relatively well-collimated light can be more effectively used in mirror-lined duct systems for transporting light. As the sunlight is concentrated, the collimation angle will increase from the input collimation half-angle of sunlight, about ¼ degree. Generally, the collimation half-angle θo of concentrated sunlight passing through the light duct 170 should be restricted to no greater than about 30 degrees, or no greater than about 25 degrees, or no greater than about 20 degrees. In one particular embodiment, the collimation angle θo can be about 23 degrees. The accuracy of tracking the sun, as well as the accuracy of the various optical components (for example, flatness and placement of reflective vanes, parabolic reflector shape, and hyperbolic reflector shape) all contributes to the resulting collimation angle θo. For example, the accuracy of rotation, tilt angle, and azimuth angle of the sun, can affect both the concentration ratio of input light area to output light area and output collimation half-angle θo.

Figure 2B:
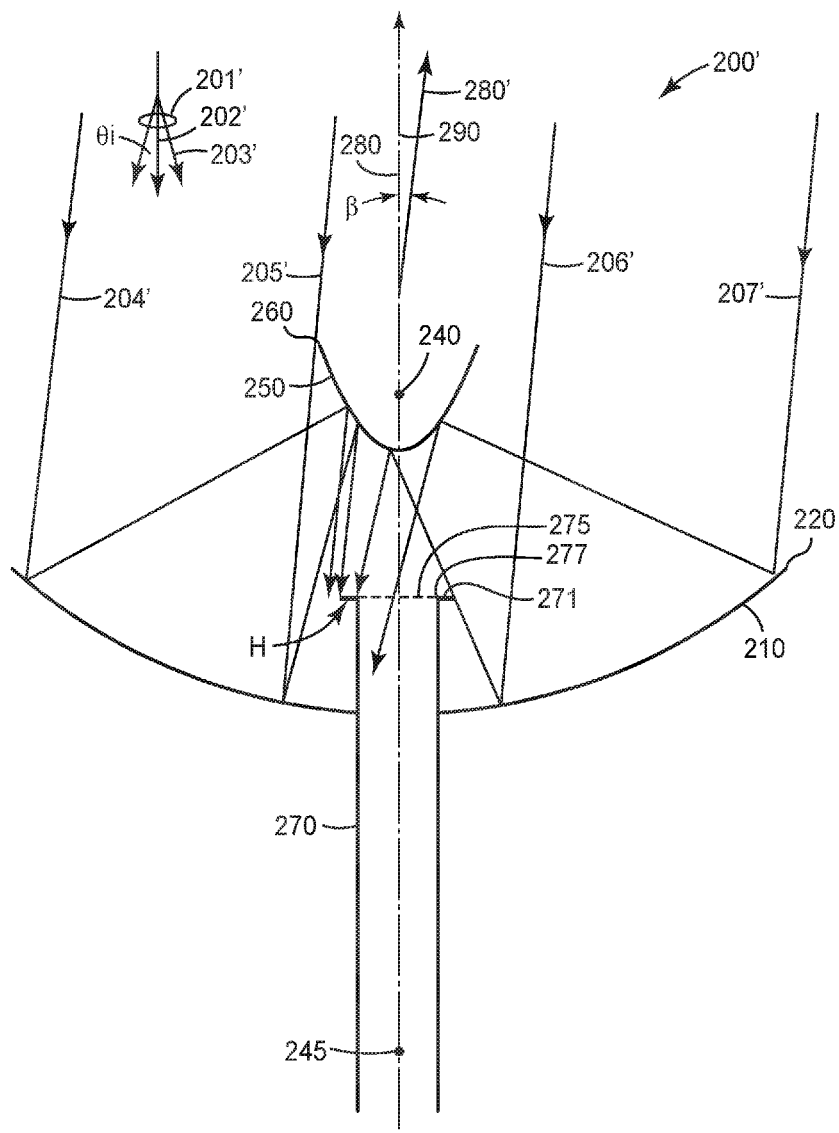
FIG. 2B shows a cross-sectional schematic view of a misaligned solar concentrator.

FIG. 2B shows a cross-sectional schematic view of a misaligned solar concentrator 200', according to one aspect of the disclosure. Each of the elements 210-290 shown in FIG. 2B correspond to like-numbered elements 110-190 shown in FIG. 1, which have been described previously. For example, parabolic reflector 210 shown in FIG. 2A corresponds to parabolic reflector 110 shown in FIG. 1, and so on. In FIG. 2B, the solar position has moved from first axis 280 shown in FIG. 2A, to a misaligned axis 280' which forms an angular misalignment angle β degrees. In some cases, the misalignment angle can be as small as 5 degrees, or 4 degrees, or 3 degrees, or 2 degrees, or even as small as 1 degree to cause unacceptable misalignment of the parabolic reflector 210.

An input light beam 201' from a source, such as the sun, includes a central light ray 202' travelling along the propagation direction, and boundary light rays 203' traveling within an input collimation angle θi of the central light ray 202'. Each of the light rays 204', 205', 206', 207' entering solar concentrator 200' and travelling parallel to the misaligned axis 280' within the input collimation angle θi, reflect from the parabolic reflector 210 and are directed toward the hyperbolic reflector 250. Each of the light rays 204', 205' then reflect from the hyperbolic reflector 250 and are directed toward the solar concentrator alignment device 271, and impinges on the solar concentrator alignment device 271 in hot region "H" as a second portion of the input light beam 201'. Each of the light rays 206', 207' reflect from the hyperbolic reflector 250 and are directed away from the entrance aperture 275. The second portion of the input light beam 201 that impinges on hot region "H" cause a change in the thermal environment of the thermally conductive plate, and generates a signal to a control circuit (not shown) that changes the position of the misaligned solar concentrator 200' back to an aligned solar concentrator 200 shown in FIG. 2A, as described elsewhere.

Figure 3A:
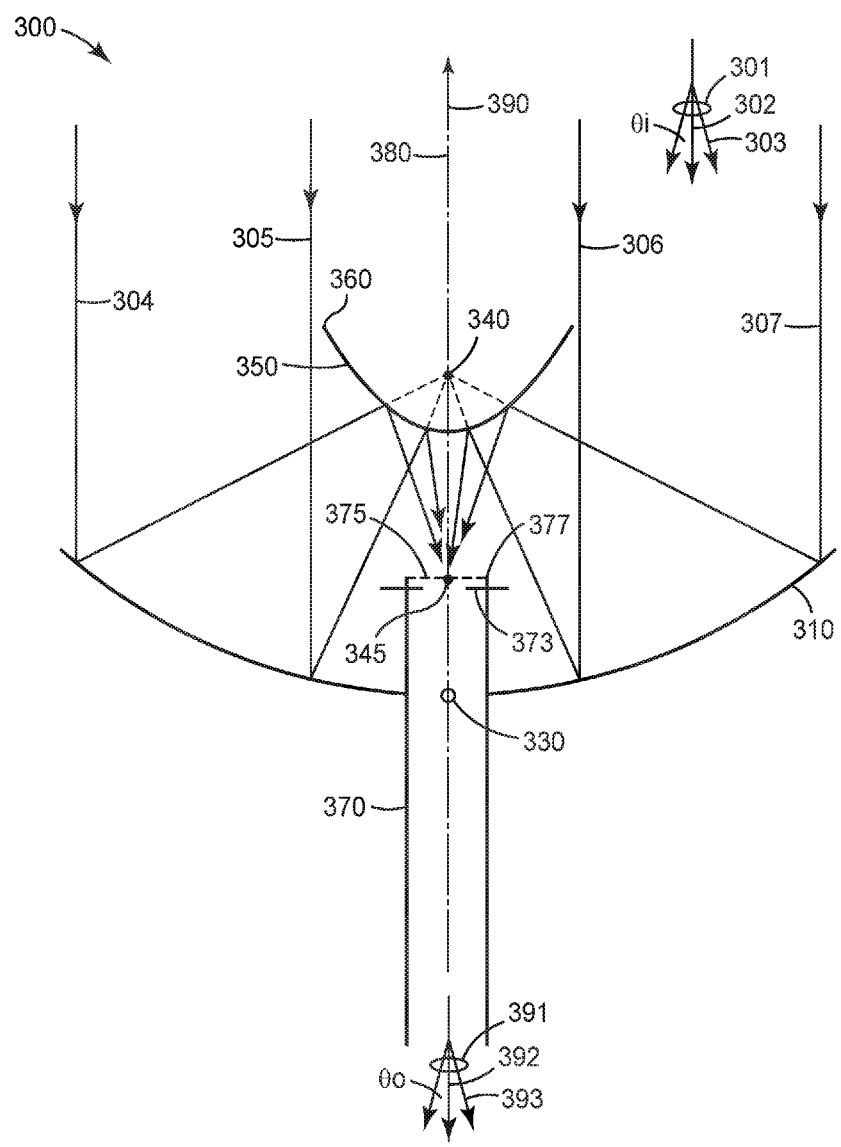
FIG. 3A shows a cross-sectional schematic view of a solar concentrator in solar alignment.

FIG. 3A shows a cross-sectional schematic view of an aligned solar concentrator 300 according to one aspect of the disclosure. Each of the elements 310-393 shown in FIG. 3A correspond to like-numbered elements shown in FIG. 2A, which have been described previously. For example, parabolic reflector 310 in FIG. 3A corresponds to parabolic reflector 210 in FIG. 2A, and so on. In FIG. 3A, the relative positions of the second focal point 345 and the vertex 330 have been changed relative to the positions shown in FIG. 2A. Second focal point 345 is shown to be disposed between the vertex 330 and the first focal point 340, and within the entrance aperture 375 surrounded by upper rim 377 of the light duct 370. It is to be understood that the relative positions of the second focal point 345 and the vertex 330 can be positioned as desired along the first axis 280, by proper selection of the hyperbolic reflector 350 and the parabolic reflector 310. In one particular embodiment, the relative positions of the second focal point 345 and the vertex 330 can be selected such that the entrance aperture 375 can be located below the vertex 330, as described elsewhere, for example in co-pending U.S. Patent Application Ser. No. 61/589,544 entitled OFF AXIS CASSEGRAIN SOLAR COLLECTOR (filed Jan. 23, 2012).

An input light beam 301 from a source, such as the sun, includes a central light ray 302 travelling along the propagation direction, and boundary light rays 303 traveling within an input collimation angle θi of the central light ray 302. Each of the light rays 304, 305, 306, 307 entering solar concentrator 300 and travelling parallel to the first axis 380 within the input collimation angle θi, reflect from the parabolic reflector 310 and are directed toward the parabolic focal point 340. Each of the light rays 304, 305, 306, 307 then reflect from the hyperbolic reflector 350 and are directed toward the second focal point 345, through the region where a solar concentrator alignment device 373 is disposed adjacent and below the entrance aperture 375 and both interior and exterior to the upper rim 377. The light rays 304, 305, 306, 307 exit as output light beam 391 having a central light ray 392 travelling in the propagation direction, and boundary light rays 393 travelling within an output collimation angle θo of the central light ray 392.

Figure 3B:
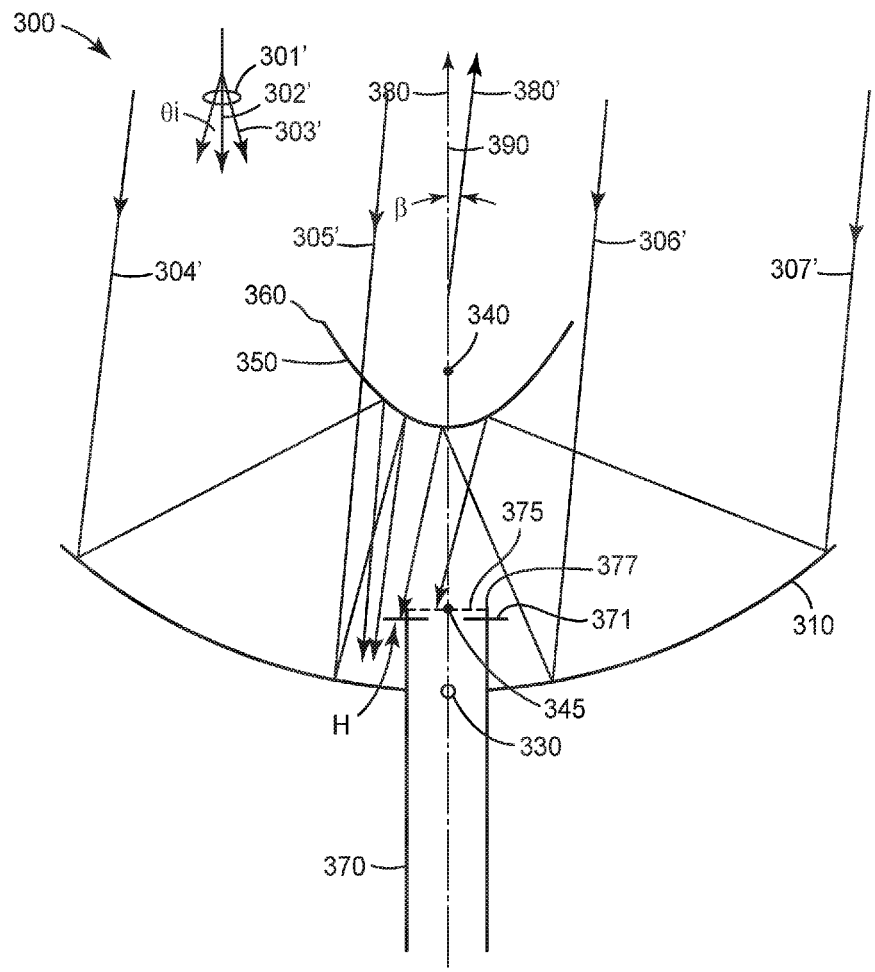
FIG. 3B shows a cross-sectional schematic view of a misaligned solar concentrator.

FIG. 3B shows a cross-sectional schematic view of a misaligned solar concentrator 300', according to one aspect of the disclosure. Each of the elements 310-393 shown in FIG. 3B correspond to like-numbered elements shown in FIG. 2A, which have been described previously. For example, parabolic reflector 310 in FIG. 3B corresponds to parabolic reflector 210 in FIG. 2A, and so on. In FIG. 3B, the solar position has moved from first axis 380 shown in FIG. 2A, to a misaligned axis 380' which forms an angular misalignment angle β degrees. In some cases, the misalignment angle can be as small as 5 degrees, or 4 degrees, or 3 degrees, or 2 degrees, or even as small as 1 degree to cause unacceptable misalignment of the parabolic reflector 310.

An input light beam 301' from a source, such as the sun, includes a central light ray 302' travelling along the propagation direction, and boundary light rays 303' traveling within an input collimation angle θi of the central light ray 302'. Each of the light rays 304', 305', 306', 307' entering solar concentrator 300' and travelling parallel to the misaligned axis 380' within the input collimation angle θi, reflect from the parabolic reflector 310 and are directed toward the hyperbolic reflector 350. Each of the light rays 304', 305' then reflect from the hyperbolic reflector 350 and are directed toward the solar concentrator alignment device 371, and impinges on the solar concentrator alignment device 371 in hot region "H" as a second portion of the input light beam 301'. Each of the light rays 306', 307' reflect from the hyperbolic reflector 350 and are directed away from the entrance aperture 375. The second portion of the input light beam 301 that impinges on hot region "H" cause a change in the thermal environment of the thermally conductive plate, and generates a signal to a control circuit (not shown) that changes the position of the misaligned solar concentrator 300' back to an aligned solar concentrator 300 shown in FIG. 3A, as described elsewhere.

It is to be understood that the solar concentrator alignment device 373 can be positioned as desired along the line connecting the first and second focal points 340, 345, and can be used with any of the concentrator designs described in, for example, in U.S. Patent Application Ser. No. 61/589,544 entitled OFF AXIS CASSEGRAIN SOLAR COLLECTOR (filed Jan. 23, 2012). In some cases, the relative positions of the second focal point 345 and the vertex 330 can be changed relative to the positions shown in FIG. 3B, and the upper rim 377' surrounding entrance aperture 375' of light duct 370 can be positioned on the other side of the vertex 330 from the second focal point 345. Second focal point 345 can still be disposed between the vertex 330 and the first focal point 340, and light rays directed toward second focal point 345 enter light duct 370 through the entrance aperture 375'.

In some cases, the optional exit aperture 132 and the light duct 170 shown in FIG. 1 can be removed, and the concentrated sunlight can be directed toward an energy conversion device (not shown) such as a photovoltaic device or a thermal conversion device, disposed near the second focal point 145. Each of the hyperbolic reflector 150 and the energy conversion device can be affixed in position. Alternatively (not shown), a photovoltaic or thermal conversion device could be mounted near the first focus 140 and the hyperbolic reflector 150 removed. The thermal alignment device could then be mounted around the first focus 140, as would be understood by one of skill in the art.

In some cases, the optional exit aperture 132 can be disposed in the parabolic reflector 110, along a line 131 passing through the vertex 130 and lying in the plane that includes the vertex 130 and the second axis 190. In some cases, the optional exit aperture 132 can comprise a material that is transparent to solar radiation such as a polymer or a glass; in some cases, the optional exit aperture 132 can be a slot cut in the parabolic reflector 110. In one particular embodiment, the optional exit aperture 132 can extend along the line 131 between the vertex 130 and the first outer rim 120, without intersecting the first outer rim 120, such that any desired pivoting along the elevation direction 185 can be accommodated.

Figure 4A:
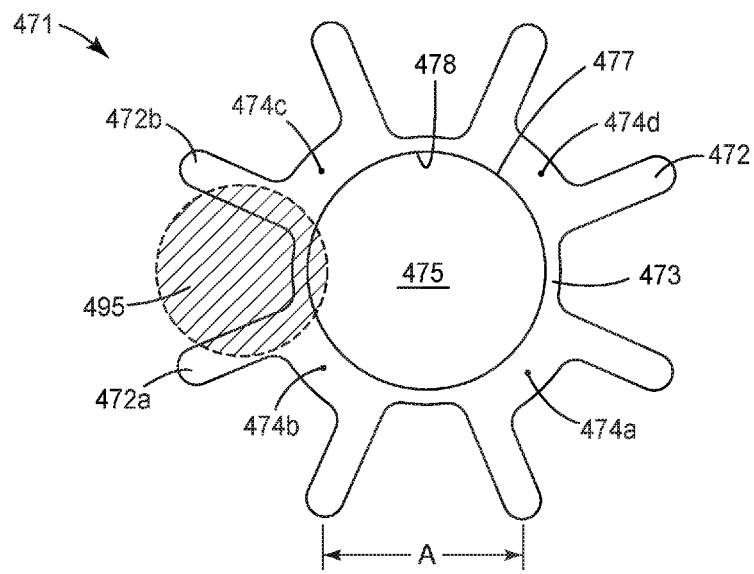
FIG. 4A shows a schematic view of a solar concentrator alignment device.

FIG. 4A shows a schematic view of a solar concentrator alignment device 471, according to one aspect of the disclosure. The solar concentrator alignment device 471 includes a thermally conductive plate 473 having a plurality of thermal sensors 474a, 474b, 474c, 474d, in thermal contact with the thermally conductive plate 473 at positions surrounding an aperture 475 of a solar light duct (not shown). In one particular embodiment, each of the thermal sensors 474a, 474b, 474c, 474d, can be thermocouples that are attached to the backside of the thermally conductive plate 473. The solar light duct includes an upper rim 477, and the thermally conductive plate 473 can have an inner perimeter 478 that is essentially coincident with the upper rim 477. A plurality of fins 472 extend outwardly from the aperture 475.

Each adjacent pair of the plurality of fins 472 are positioned such that a fin separation "A" is smaller than the effective diameter of a concentrated solar beam 495 that is intended to enter the aperture 475. As shown in FIG. 4A, the concentrated solar beam 495 has moved from the aperture 475 and impinges on a pair of fins 472a and 472b generating a "hot spot", as described elsewhere. The thermal sensors 474b and 474c therefore are in a different thermal environment than thermal sensors 474a and 474d, and a signal is generated to reposition the concentrated solar beam 495 within the aperture 474 by changing the azimuth and/or elevation of the solar concentrator, as described elsewhere.

In one particular embodiment, the thermal sensors are disposed around the aperture uniformly, for example, two sensors may be positioned 180 degrees apart from each other on opposite sides of the aperture, three sensors may be positioned 120 degrees apart from each other, four sensors may be positioned 90 degrees apart from each other, and so on. In one particular embodiment, a first pair of opposing thermal sensors can detect changes in azimuthal alignment, and a second pair of opposing thermal sensors can detect changes in elevation alignment.

In one particular embodiment, each sensor may have a pair of fins on either side of the sensor, extending outward from the aperture. In one particular embodiment, each sensor may have a pair of fins on either side of the sensor, extending inward toward the aperture. In some cases, each of the thermal sensors may be thermally isolated from adjacent thermal sensors, such that instead of a continuous thermally conductive plate surrounding the aperture, a plurality of thermally conductive plates (each having at least one thermal sensor) may be disposed around the aperture.

Figure 4B:
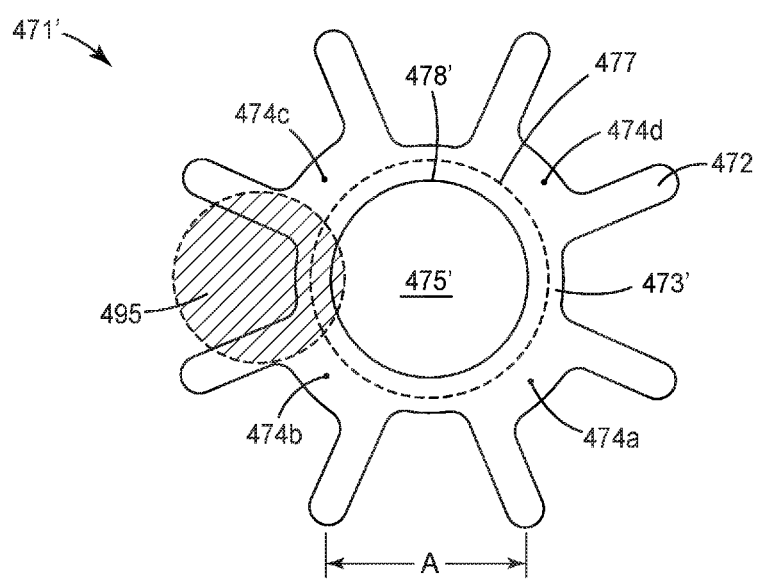
FIG. 4B shows a schematic view of a solar concentrator alignment device.

FIG. 4B shows a schematic view of a solar concentrator alignment device 471', according to one aspect of the disclosure. The solar concentrator alignment device 471' includes a thermally conductive plate 473' having a plurality of thermal sensors 474a, 474b, 474c, 474d, in thermal contact with the thermally conductive plate 473' at positions surrounding an aperture 475' of a solar light duct (not shown) that extends into the page. In one particular embodiment, each of the thermal sensors 474a, 474b, 474c, 474d, can be thermocouples that are attached to the backside of the thermally conductive plate 473'. The solar light duct includes an upper rim 477, and the thermally conductive plate 473' can have an inner perimeter 478' that includes a smaller diameter than the upper rim 477. A plurality of fins 472 extend outwardly from the aperture 475'.

Each adjacent pair of the plurality of fins 472 are positioned such that a fin separation "A" is smaller than the effective diameter of a concentrated solar beam 495 that is intended to enter the aperture 475'. As shown in FIG. 4B, the concentrated solar beam 495 has moved from the aperture 475' and impinges on a pair of fins 472a and 472b generating a "hot spot", as described elsewhere. The thermal sensors 474b and 474c therefore are in a different thermal environment than thermal sensors 474a and 474d, and a signal is generated to reposition the concentrated solar beam 495 within the aperture 474 by changing the azimuth and/or elevation of the solar concentrator, as described elsewhere.

Figure 5:
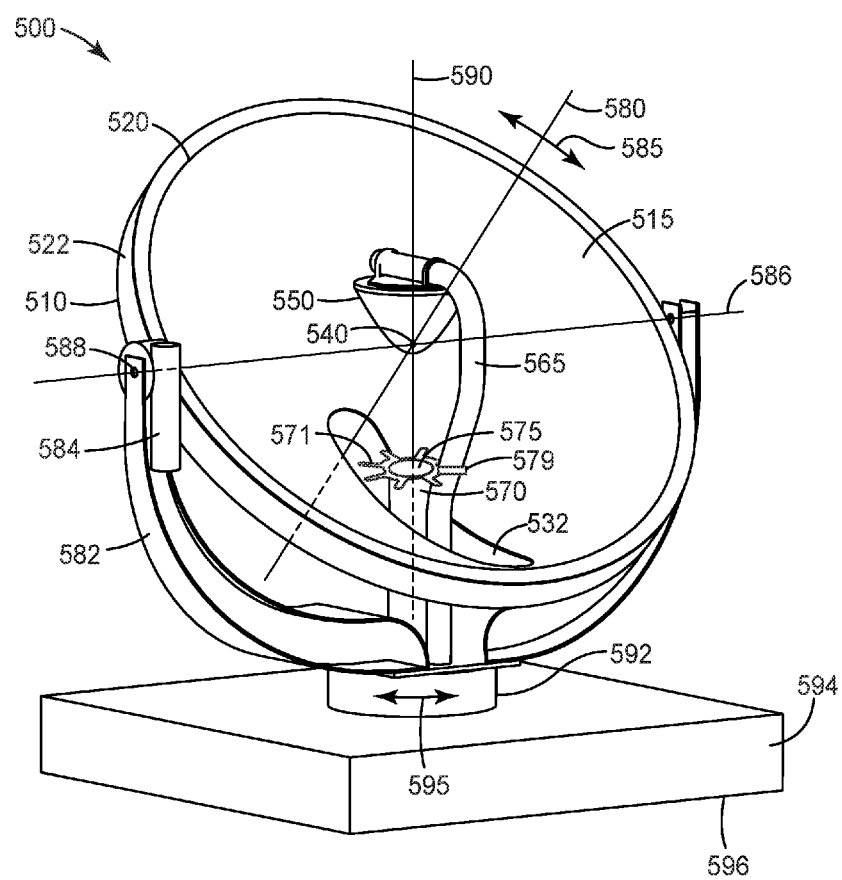
FIG. 5 shows a perspective view of a solar concentrator.

FIG. 5 shows a perspective view of a solar concentrator 500, according to one aspect of the disclosure. Each of the elements 510-595 shown in FIG. 5 correspond to like-numbered elements shown in FIG. 1, which have been described previously. For example, parabolic reflector 510 in FIG. 5 corresponds to parabolic reflector 110 in FIG. 1, and so on. Solar concentrator 500 further includes one particular embodiment of structures and mechanisms that can be used to effectively track the sun during operation of the solar concentrator 500.

Solar concentrator 500 includes a parabolic reflector 510 having an interior reflective surface 515 and a first outer rim 520. An optional support ring 522 can be affixed to the outer rim 520 to provide resistance to deformation of the parabolic reflector 510 due to movement, winds, and the like. The parabolic reflector 510 has a geometry that can be characterized by a parabolic focal point 540, and a first axis 580 extending between the vertex (not shown) and parabolic focal point 540. Solar concentrator 500 further includes a hyperbolic reflector 550 and a first focal point coincident with the parabolic focal point 540. A second axis 590 extends along a line that includes the parabolic focal point 540 and the second focal point (not shown) of the hyperbolic reflector 550.

In one particular embodiment, second axis 590 can be pointed toward the zenith (that is, perpendicular to the horizontal); however, in other embodiments, second axis 590 can be pointed instead at any desired angle or orientation to the zenith. For example, the second axis 590 of the solar concentrator 500 can be directed toward the horizontal for a building side mounted concentrator. A tilt angle of the second axis 590 can depend upon the placement of the solar concentrator 500, including, for example, latitude, unobstructed view, duration and times for optimum daylighting, and the like, as described elsewhere. First axis 580 is capable of rotating about the second axis 590 along an azimuthal direction 595, without movement of the second axis 590. First axis 580 is also capable of rotating along an elevation direction 585 that pivots around the parabolic focal point 540. In one particular embodiment, first axis 580 can be positioned toward the sun, such that solar radiation incident upon the parabolic reflector 510 and reflecting from the hyperbolic reflector 550, propagates within an output collimation angle of the second axis 590, as described elsewhere.

Exit aperture 532 can be disposed in the parabolic reflector 510 as described elsewhere, and as shown in FIG. 5, is a slot 532 cut in the parabolic reflector 510. A light duct 570 is disposed along the second axis 590, and extends through the slot 532 of the parabolic reflector 510 as shown. A support structure 565 affixes hyperbolic reflector 550 to light duct 570, such that the parabolic focal point 540 and the second axis 590 remain fixed and do not move. A solar concentrator alignment device 571 is positioned proximate the entrance aperture 575 of the light duct 570. The solar concentrator alignment device 571 can be also be affixed to the support structure 565 by an attachment fixture 579, to reduce motion. In some cases, shown in FIG. 5, support structure 565 affixes hyperbolic reflector 550 to one axis of rotation of the parabolic reflector 510 such that the hyperbolic reflector 550 can rotate about the second axis 590. The light duct 570 includes an entrance aperture 575 positioned such that light reflected from the hyperbolic reflector 550 enters light duct 570 through entrance aperture 575 and is directed toward second focal point (not shown) of hyperbolic reflector 550. Light duct 570 can be a portion of a light distribution system (not shown) used for daylight distribution system for architectural lighting.

Solar concentrator 500 includes a base 594 that has a bottom surface 596 that can be affixed to a building structure (not shown) such as a roof or side of a building. The parabolic reflector 510 is supported by supporting arm 582 through pivot points 588 and optional support ring 522, and can be rotated relative to the second axis 590 by a motor 584. A pivot line 586 through pivot points 588 also passes through parabolic focal point 540 such that any rotation of first axis 580 along elevation direction 585 does not change the relative position of the parabolic focal point 540. A rotating support 592 affixed to the base 594 rotates parabolic reflector 510 along an azimuthal direction 595 about second axis 590, again without changing the relative position of the parabolic focal point 540. The solar concentrator alignment device 571 generates control signals in response to the different thermal environments of the thermal sensors, and causes rotation about the pivot line 586 to correct for elevation errors, and causes rotation about the second axis 590 to correct for azimuthal errors.

Example

A solar concentrator alignment device was built to help direct the concentrated light from a cassegrain concentrator optical system into the opening in a mirror lined duct. The solar concentrator alignment device used a ⅛ inch (3.175 mm) thick aluminum plate cut into a pattern that included: 1) a 5.74 inch (14.61 cm) opening in the center to match the diameter of the mirror lined duct, 2) four regions having tapped holes located 90 degrees apart to mount a thermocouple, 3) two fins extending 3 inches (7.75 cm) from the opening in each region. Four thermocouples were mounted to the bottom of the plate in the sensing regions.

The length and quantity of the fins were selected to ensure that focused light (roughly 6 inches (15.2 cm) in diameter maximum) would strike at least one fin if within 6 inches (15.2 cm) of the central axis. This offset from the desired position corresponded to a significant misalignment with the sun, more than 10 degrees of error.

The surface finish and thickness of the aluminum plate were designed to help control the time constant of the thermal system. The aluminum plate absorbed some light energy and then lost some energy due primarily to convection. The energy loss might have been too slow for the control system if individual thermally isolated plates were used for each sensing region. Rather than taking many minutes for an individual plate to cool through convection after the sunlight has been removed from them, the four thermally connected sensors reached an equilibrium state much faster through conduction combined with convection.

The control system was designed to respond to the difference in temperature between two opposing thermocouples (180 degrees apart). Based on the output signals, one motor was used to drive the concentrator along the azimuthal axis. A second motor was used to tilt the parabola along the axis that passes through one focus of the hyperbolic optic. For this design, while in operation, two opposing thermocouples generally reached the same temperature within several seconds when either no light, or an equivalent light flux, was striking both regions.

The main control loop calculated a target position of the sun based on knowledge of the time, date, elevation, and latitude. The main control loop then made corrections to the concentrator orientation about every 24 seconds to maintain a target position within 0.1 degrees of the sun. A fine adjustment offset based on the thermal imbalance in the solar concentrator alignment device was added to the target position. The fine adjustment was limited to a maximum correction of 5 degrees from the calculated position. For the system studied, corrections of less than 1 degree were required to efficiently direct the light into the duct.

Experience with this system, including modeling, has shown that errors in the azimuth cause the concentrated light to drift out of the duct along the axis of rotation of the parabola. Similarly, an error in the elevation would cause the light to drift in the orthogonal direction. This allowed the control system to make a direct correction in one axis based on the difference in temperature between two thermocouples.

Following are a list of embodiments of the present disclosure.

Item 1 is a solar concentrator alignment device, comprising: a solar light duct having an aperture; a thermally conductive plate essentially parallel to and exterior to the aperture; and at least two thermal sensors in contact with the thermally conductive plate, the at least two thermal sensors being separated from each other at positions surrounding the aperture, wherein a concentrated solar light beam can be aligned to the aperture such that a first portion of the concentrated light beam intercepts the aperture and a second portion of the concentrated light beam intercepts the thermally conductive plate, causing the at least two thermal sensors to generate an aligned output signal, and wherein a change in the second portion of the concentrated solar light beam that intercepts the thermally conductive plate causes the at least two thermal sensors to generate a misaligned output signal.

Item 2 is the solar concentrator alignment device of item 1, wherein the change in the second portion of the concentrated light beam that intercepts the thermally conductive plate results from a solar concentrator misalignment in an azimuthal direction, an elevation direction, or in both the azimuthal direction and the elevation direction.

Item 3 is the solar concentrator alignment device of item 1 or item 2, wherein the change in the second portion of the concentrated solar light beam comprises an increase in the second portion of the concentrated solar light beam intercepting the thermally conductive plate.

Item 4 is the solar concentrator alignment device of item 1 to item 3, wherein the misaligned output signal causes a control signal to change alignment of a solar concentrator to the sun, to decrease the misaligned output signal.

Item 5 is the solar concentrator alignment device of item 1 to item 4, wherein the thermally conductive plate surrounds the aperture.

Item 6 is the solar concentrator alignment device of item 1 to item 5, wherein the thermally conductive plate and the aperture are coplanar.

Item 7 is the solar concentrator alignment device of item 1 to item 6, wherein the aperture is smaller than the solar light duct cross-section.

Item 8 is the solar concentrator alignment device of item 1 to item 7, wherein the thermally conductive plate comprises a plurality of fins extending outwardly from the aperture.

Item 9 is the solar concentrator alignment device of item 8, wherein the concentrated solar light beam includes an effective diameter in a plane containing the thermally conductive plate that is greater than a separation between adjacent fins.

Item 10 is the solar concentrator alignment device of item 1 to item 6, wherein the thermally conductive plate comprises eight fins disposed in pairs extending outwardly from the aperture, each pair of fins having a thermal sensor disposed between them.

Item 11 is the solar concentrator alignment device of item 10, wherein each thermal sensor is positioned at a 90 degree spacing surrounding the aperture.

Item 12 is the solar concentrator alignment device of item 10 or item 11, wherein a first pair of thermal sensors are disposed at a 180 degree spacing from each other such that a first line drawn through the first pair of thermal sensors is parallel to a horizontal plane and a second pair of thermal sensors are disposed at a 180 degree spacing from each other such that a second line drawn through the second pair of thermal sensors is perpendicular to the first line.

Item 13 is the solar concentrator alignment device of item 12, wherein the first pair of thermal sensors detect changes in the azimuth alignment, and the second pair of thermal sensors detect changes in the elevation alignment.

Item 14 is a solar concentrator alignment device, comprising: an aperture for receiving a concentrated solar light beam; a thermally conductive plate parallel to and adjacent the aperture; and a plurality of thermal sensors in contact with the thermally conductive plate, the plurality of thermal sensors being separated from each other at positions surrounding the aperture, wherein the concentrated solar light beam generates an aligned output signal from the plurality of thermal sensors when aligned to the aperture, and the concentrated solar light beam generates a misaligned output signal from the plurality of thermal sensors when misaligned to the aperture.

Item 15 is the solar concentrator alignment device of item 14, wherein the misaligned output signal can be input to a control circuit used to realign the concentrated solar light beam to the aperture.

Item 16 is the solar concentrator alignment device of item 14 or item 15, wherein a first portion of the concentrated solar light beam intercepts the aperture when aligned, and a second portion of the concentrated solar light beam intercepts the thermally conductive plate when aligned.

Item 17 is the solar concentrator alignment device of item 14 to item 16, wherein the thermally conductive plate surrounds the aperture.

Item 18 is the solar concentrator alignment device of item 14 to item 17, wherein the thermally conductive plate and the aperture are coplanar.

Item 19 is the solar concentrator alignment device of item 14 to item 18, wherein the aperture is smaller than the solar light duct cross-section.

Item 20 is the solar concentrator alignment device of item 14 to item 19, wherein the thermally conductive plate comprises a plurality of fins extending outwardly from the aperture.

Item 21 is the solar concentrator alignment device of item 20, wherein the concentrated solar light beam includes an effective diameter in a plane containing the thermally conductive plate that is greater than a separation between adjacent fins.

Item 22 is the solar concentrator alignment device of item 14 to item 21, wherein the thermally conductive plate comprises eight fins disposed in pairs extending outwardly from the aperture, each pair of fins having a thermal sensor disposed between them.

Item 23 is the solar concentrator alignment device of item 22, wherein each thermal sensor is positioned at a 90 degree spacing surrounding the aperture.

Item 24 is the solar concentrator alignment device of item 14 to item 23, wherein the misaligned concentrated solar light beam results from a solar concentrator misalignment in an azimuthal direction, an elevation direction, or in both the azimuthal direction and the elevation direction.

Item 25 is the solar concentrator alignment device of item 4 or item 24, wherein the solar concentrator is a cassegrain solar concentrator having a hyperbolic reflector, and the thermally conductive plate is positioned on an axis between the hyperbolic reflector and the solar light duct.

Item 26 is a method for maintaining the alignment a solar concentrator to the sun, comprising: providing a solar concentrator including the solar concentrator alignment device of item 1 to item 25; initially aligning the solar concentrator to the sun, thereby providing the aligned output signal; providing a control system capable of changing the azimuth and elevation of the solar concentrator; monitoring the thermal sensors for a misaligned output signal; and changing the azimuth and/or elevation of the solar concentrator to change the misaligned output signal to the aligned output signal.

Item 27 is the method of item 26, further comprising using a solar positioning algorithm to initially align the solar concentrator to the sun.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A solar concentrator alignment device, comprising:
    an aperture for receiving a concentrated solar light beam;
    a thermally conductive plate parallel to and adjacent the aperture; and
    a plurality of thermal sensors in contact with the thermally conductive plate, the plurality of thermal sensors being separated from each other at positions surrounding the aperture,
wherein the concentrated solar light beam generates an aligned output signal from the plurality of thermal sensors when aligned to the aperture, and the concentrated solar light beam generates a misaligned output signal from the plurality of thermal sensors when misaligned to the aperture, wherein the thermally conductive plate comprises eight fins disposed in pairs extending outwardly from the aperture, each pair of fins having a thermal sensor disposed between them.

2. The solar concentrator alignment device of claim 1, wherein each thermal sensor is positioned at a 90 degree spacing surrounding the aperture.

* * * * *